Jan. 15, 1935.  J. P. PETERS  1,988,047
APPARATUS FOR MOLDING, SHAPING, AND ELONGATING DOUGH ROLLS
Filed Jan. 27, 1934   2 Sheets-Sheet 1
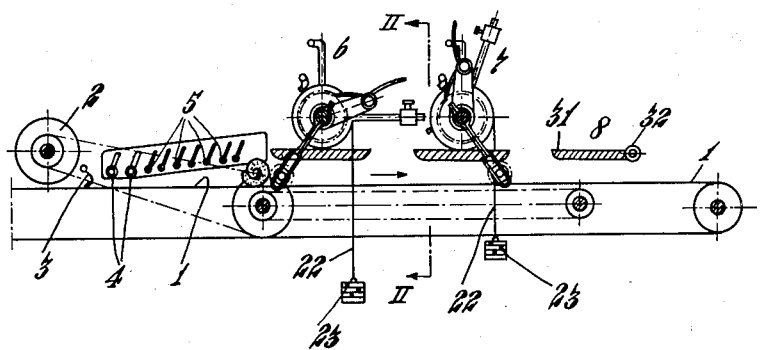
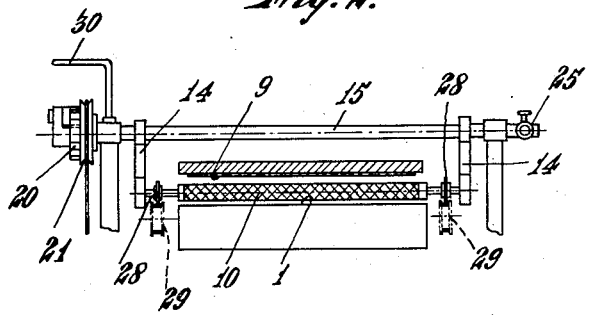
J. P. Peters
INVENTOR
By: Marks & Clark
Attys.

Jan. 15, 1935. J. P. PETERS 1,988,047
APPARATUS FOR MOLDING, SHAPING, AND ELONGATING DOUGH ROLLS
Filed Jan. 27, 1934 2 Sheets-Sheet 2
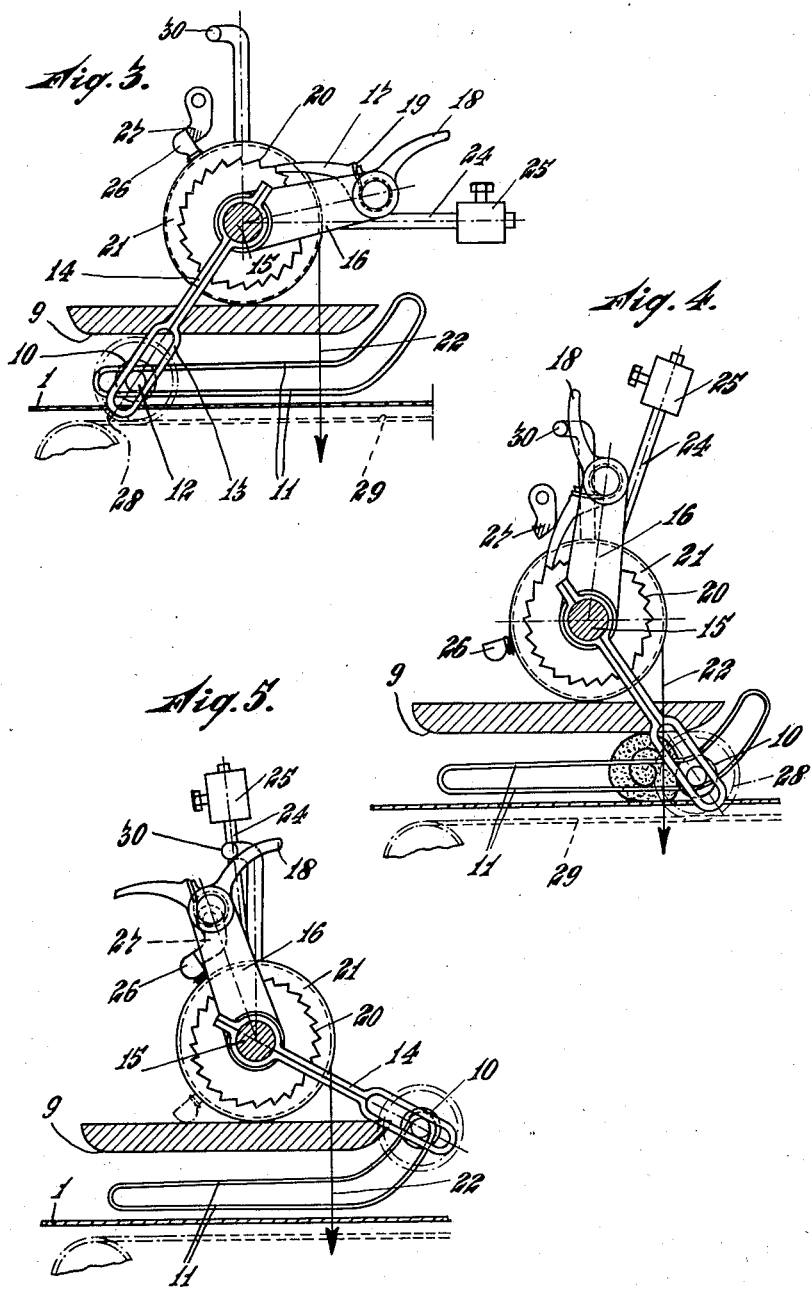
J. P. Peters
INVENTOR
By Marks & Clerk
ATTYS.

Patented Jan. 15, 1935

1,988,047

UNITED STATES PATENT OFFICE 1,988,047

APPARATUS FOR MOLDING, SHAPING, AND ELONGATING DOUGH ROLLS

Johannes Philippus Peters, Rotterdam, Netherlands

Application January 27, 1934, Serial No. 708,634
In the Netherlands June 7, 1933

6 Claims. (Cl. 107—9)

Various methods and apparatuses have already been proposed for the purpose of mechanically elongating rolls of proved dough. Up to the present however it has not proved to be possible to apply an apparatus, or a mechanical method which not only meets the requirement that proved dough should not be "killed", but also all the other requirements of the bakers with regard to the shape and the composition of an elongated roll or scroll of proved dough.

The object of the present invention is to remove the existing difficulties and consists in conveying the dough roll while rotating, parallel to itself and bringing the same into contact with a preferably rotatable roller which roller is endeavouring to oppose the rotation of the roll or scroll of dough.

According to the invention the pressure exercised by the roller on the roll of dough is preferably adjustable.

Preferably, according to the invention use is made of an apparatus characterized in that in an elongating channel formed by a moving conveyor and a rolling or counter wall placed at some distance above the same, there is arranged a preferably rotatable roller which is movable in the path of the dough roll, in such a way that the said roller endeavours to oppose the rotation of the roll of dough, the said roller after having been conveyed through a certain distance, being brought out of contact with the dough roll.

When bringing the invention into practice, the rolling wall need not be placed at a short distance above the conveyor, so that the dough will not be "killed"; the elongating chamber therefore in a vertical direction is more roomy than the known chambers of this type, and this has been rendered possible by the use of a roller exercising a kneading action on the dough, thus imparting to the surface of the dough a suitable tension and producing a resilient elongating action, as the dough roll is never entirely closed.

According to the invention the roller by means of a sprocket wheel or the like connected to the same, may be coupled to a chain or another endless driving means. In this manner it is easier to regulate the operation of the roller, viz. to determine its speed of rotation with reference to the travelling speed of the belt, drum or other conveyor. It has been proved in practice that a circumferential speed of about one third of the travelling speed of the conveyor is to be preferred.

A simple construction of a device according to the invention is characterized in that the roller is coupled with a crank fixed on a shaft subjected to a weight or spring load working in opposite direction with reference to the travelling movement of the roll of dough.

According to the invention the weight or spring load by means of a pawl coupling or otherwise is working on the shaft in such a manner that after a predetermined displacement of the same by the roll of dough, the said roller is completely or partially released from the action of the weight or spring load.

In a practical embodiment of an apparatus according to the invention the crank may be fixed on a shaft which is located at a short distance above the rolling wall and normally kept in an initial position in which the roller is in the receiving portion of the channel, and on which shaft there is mounted a pawl which under normal conditions engages a sprocket wheel rigidly coupled with a disc subjected to the action of the weight, whilst in the path of the pawl there is arranged an abutment which becomes operative approximately at the moment in which the roller is going to release the roll of dough.

According to the invention the apparatus may be subdivided longitudinally or widthwise in accordance with the desired capacity of production.

The new elongating apparatus may be preceded by a rolling up device comprising, according to the invention, a series of bar- or tube-shaped members, which in the direction of the conveying movement are supported one after the other and each of them separately freely movable upwards and rotatable in the path of the arriving curled-over sheet of dough.

Preferably the ends of said members are situated in slotted side frames, the slots inclining in the direction of movement of the conveyor.

In this manner various modifications and improvements are possible within the scope of the invention; one of the possible embodiments by way of example will now be further explained with reference to the annexed more or less schematic drawings.

Fig. 1 is a side elevation of a portion of an apparatus for molding or shaping dough, adapted for rolling up a sheet of dough and subsequently elongating the roll of dough.

Fig. 2 is a cross section along the line II—II in Fig. 1.

Fig. 3 is a side elevation of the elongating apparatus in the position ready for receiving a roll of dough.

Fig. 4 is a similar view as that of Fig. 3, but in the position in which the roller begins to move upwards.

Fig. 5 likewise is a similar view, as in Fig. 3, but in the final position.

In Fig. 1 the conveyor carrying a sheet of dough which has been brought into the correct shape underneath the devices for molding and shaping the dough, is denoted by 1. The sheet is carried underneath a roller 2 and when arriving from under the same is immediately curled over by means of a flap 3 extending over the entire width of the sheet of dough. In the path of the curled-over sheet of dough there is supported a series of tubes and rods 4 and 5, respectively of small diameter each of them being rotatable and freely movable inclined up and down in such a manner that the sheet of dough is completely or nearly completely rolled up.

The said bar- or tube-shaped rolling-up members 4, 5 may be either of a round or of a different shape, such as e. g. a square, cross section and they are forming in combination with the conveyor a kind of a rolling up chamber with a variable cross section.

The roll or scroll of dough obtained in this, or in a different manner is then carried underneath the elongating apparatus 6, then underneath a similar device 7 and is then ready to be delivered under a guiding means 8.

The apparatus 6 will be further described with reference to Figs. 3–5.

At a sufficient distance above the conveyor, there is arranged a rolling board 9 in such a manner that the rolling channel thus formed will get slightly narrower in the direction of travelling of the conveyor. In this rolling channel a roller 10 is adapted to be displaced in guiding means 11; the grooved ends 13 of cranks 14 connected to a shaft 15 embrace the journals 12 of the said roller. To the said shaft 15 there is rigidly connected an adjustable crank 16 having tail-end pawls 17 and 18 which are normally held in engagement with a ratchet wheel 20. This ratchet wheel 20 together with a rope pulley 21 connected with it is freely rotatable around the shaft 15. Over this rope pulley 21 there is passed a rope 22 to which a weight 23 is attached, by means of which the forward pressure of the roller 10 against the roll of dough may be controlled.

It will be clear that because of this construction the roller will be continuously pressed forward with a predetermined pressure (Fig. 3). The cranks 14 with the roller 10 are held nearly in balance by means of an arm 24 carrying an adjustable counter weight 25, said arm being connected to the shaft 15.

The initial position illustrated in Fig. 3 is determined by means of a nose 26 of the disc 21 and a fixed abutment 27.

On the journals of the roller 10 there are attached sprocket wheels engaging continuously travelling endless chains 29, so that the roller is continually kept rotating. The peripheral speed of the roller 10 is less than the travelling speed of the belt 1.

As soon as a completely or nearly completely rolled-up sheet of dough coming as a roll or scroll of dough from the rolling-up apparatus 4, 5, enters into the elongating channel, the said roll of dough will contact with the roller 10 and travels forwardly while rotating and while pushing forward the said roller 10. Because of this the peripheral speed of the roller 10 is increased to approximately one third of the travelling speed of the belt. In this way the dough is drawn out as it may be called and is tensioned at its surface, and this will produce the desired elongating operation which will also insure a loaf with a good shape of the "closure", and corresponds as much as possible to the last stage of the treatment by hand. As soon as the roller 10 arrives into the position according to Fig. 4, the tail end 18 of the pawl 17 will abut against a rigid, but adjustable abutment 30, which causes the pawl to be disengaged from the ratchet wheel, so that the said wheel, being weight loaded, will immediately rotate back into the position according to Fig. 3.

The roller 10 is then freed from the forward pressure, so that the roll or scroll of dough can readily and without any detriment to itself lift the said roller and pass on below the same.

It will be noted that by reference to Fig. 5 that the cranks 14 and the arm 24 occupy such relative angular positions that when the roller 10 is raised incident to the passage of the dough thereunder, the arm 24 assumes a position substantially at the upper dead center of the shaft 15 whereas the cranks 14 with the roller 10 supported therein are in such position that they will act by gravity to tilt the arm 24 out of its upright position as shown in Fig. 5 whereupon the weight 25 becomes effective to turn the shaft 15 in a clockwise direction and cause the sprocket wheels 28 to engage the chains 29. The motion of the upper portion of the chains 29 being from right to left, the forward motion of the cranks 14 toward the left is continued until the latter are returned to the initial position illustrated in Fig. 3. It will be understood that during the return movement of the cranks 14 and 16, the pawl 17 rides inactively over the ratchet wheel 20.

The roll of dough will then arrive into a second elongating channel where it is further treated; the convergence of the chambers is coordinated to the loss in thickness caused by the roller 10. When it emerges from the second elongating channel, the finished roll of dough is delivered below a guiding board 31 with a delivery roller 32.

In the construction as illustrated the elongating apparatus is subdivided into two parts; this has the advantage that, when only one roller 10 is used per elongating channel, this roller will be very quickly ready for the next roll of dough, which will of course increase the production capacity of the machine. It is not necessary that there should be any operating connection between the sheet forming mechanism and the single or multiple elongating device and preceding devices for treating the dough and belonging to the combined installation, so that the elongating device is adapted to operate entirely independent of the moment of the introduction of a ball of dough.

The rolling boards may be made of wood and coated at the under side with canvas or some other friction material. The roller 10 of the first elongating channel is coated with canvas, the roller of the second elongating channel may be uncoated. Preferably these rollers are made of light weight tubing material, which makes it more easy for the roll of dough to move upward out of the elongating channel.

It is also possible to have a roller 10 operate each time behind a roll of dough upon its arrival, in which case of course the directions of rotation which then occur, are to be taken into account.

The rolling wall may then consist of a belt moving with increased speed with reference to that of the conveyor, in which case the roller 10 will then operate at the side fronted to the rolling wall in the same sense as it does now at the side fronted to the conveyor.

It is also possible to use free rollers moving in a circle, or completely controlled rollers, in which case the roll of dough itself will each time either directly or indirectly release a roller 10, which will then drop into the elongating channel in front of the scroll of dough and in the manner as described, will take its part in the elongating operation, etc. The rollers might also be suspended in an arm cross or in a chain-shaped carrier, without exceeding the scope of the present invention.

I claim:

1. Apparatus for elongating dough rolls comprising a moving conveyor, a rolling wall arranged above the conveyor and forming therewith a rolling channel, a counter pressure roller, means normally tending to press said roller against a dough roll advancing with said conveyor, means for guiding said roller to a position out of the path of the dough roll as the latter passes out of said channel, and means for imparting rotary movement to said roller while the latter is being advanced by the dough roll, said roller being rotated in a direction opposite to that of the dough roll.

2. An apparatus as claimed in claim 1, characterized by the provision of means for relieving the pressure exerted by said pressure means as said roller moves out of the path of the dough roll.

3. An apparatus for elongating dough rolls comprising a moving conveyor, a rolling wall arranged above said conveyor and forming therewith a rolling channel, a shaft arranged above said wall, a crank carried by said shaft, a counter pressure roller journalled in said crank and movable through said channel and normally occupying a position at the entrance to the latter, said roller being engageable with the dough roll moving with said conveyor, pressure exerting means acting on said roller, said pressure exerting means including a loaded ratchet wheel mounted on said shaft, and a pawl coacting with said ratchet wheel and connected with said crank, means coacting with said pawl for disengaging the latter from the ratchet wheel when said pressure roller approaches the limit of its travel under the influence of the dough roll whereby the pressure exerted on said roller is relieved, and means for guiding said roller out of the path of the dough roll.

4. An apparatus as claimed in claim 1 characterized in that said means for imparting rotary movement to said roller includes a power driven member, and means connected with said roller for engaging the power driven member whereby rotary motion is imparted to said roller.

5. An apparatus as claimed in claim 1 characterized in that said counter pressure roller at the point of contact with the dough roll moves in the same direction as the adjacent portion of said roll, the circumferential speed of said roller being less than at least one-third of the speed of movement of the conveyor.

6. An apparatus as claimed in claim 1 characterized in that a plurality of said channels and related counter pressure rollers are arranged side by side across the width of the moving conveyor and one behind the other in the direction of the movement thereof.

JOHANNES PHILIPPUS PETERS.